June 8, 1926.

E. L. CONNELL

ELECTRIC MOTOR

Filed July 28, 1924

1,587,760

2 Sheets-Sheet 2

Inventor

Edwin L. Connell

By Brockett, Hyde & Milburn

Attorneys

Patented June 8, 1926.

1,587,760

UNITED STATES PATENT OFFICE.

EDWIN L. CONNELL, OF CLEVELAND, OHIO, ASSIGNOR TO THE VAN DORN ELECTRIC TOOL COMPANY, OF CLEVELAND, OHIO, A CORPORATION OF OHIO.

ELECTRIC MOTOR.

Application filed July 28, 1924. Serial No. 728,658.

This invention relates to electric motors and more particularly to induction motors such as are used in portable tools for driving drills, reamers and other implements.

The object of the invention is generally to provide an improved induction motor with maximum torque at low speed and specifically by the use of a wound secondary with short circuited resistance, said resistance being so arranged as to be protected against any cumulative heating effect and to protect the more delicate motor parts against heat, and at the same time avoid the use of slip rings or the necessity of a more or less permanent and separate mounting for the resistance outside of the motor.

Further objects of the invention are in part obvious and in part will appear more in detail hereinafter.

Figure 1:
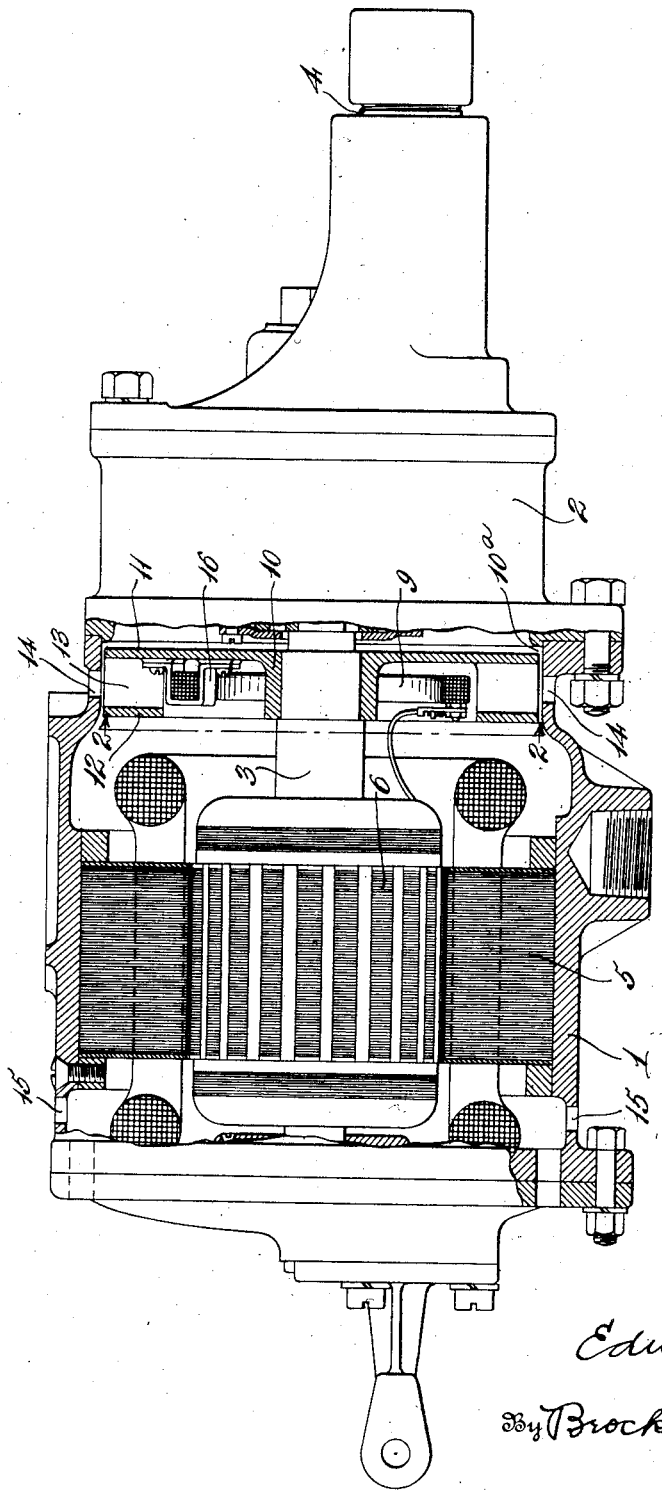
Figure 2:
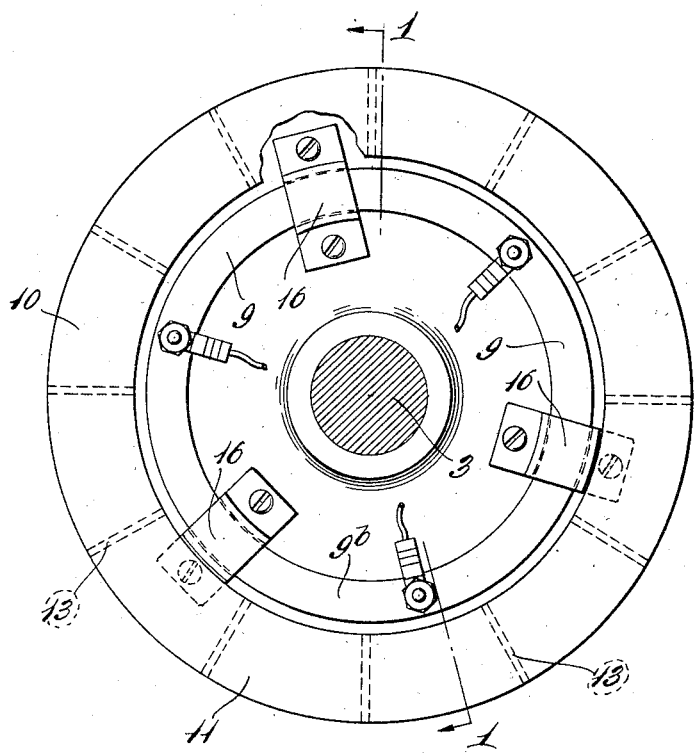
Figure 3:
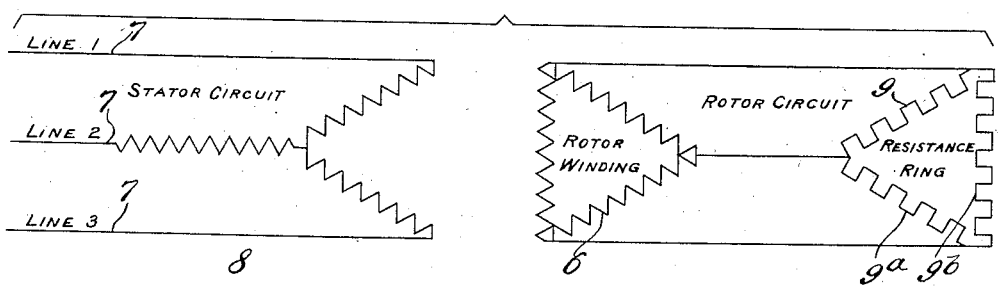

In the drawings, Fig. 1 represents a longitudinal sectional elevation of one device embodying the invention; Fig. 2 is a cross section on the line 2—2, Fig. 1; and Fig. 3 is a diagrammatic view of the electrical circuit.

The drawings show the invention applied to a portable electric tool, including an outer frame or casing 1 to which is connected the gear box 2 in which are located the necessary reducing gears (not shown) interposed between the motor shaft 3 and driven tool shaft 4. The motor is an induction motor, including the usual stator or primary 5 mounted in the casing, within which is located the secondary 6 supported by the motor shaft. In this motor the current supply is three phase from the leads 7 and the primary winding, indicated conventionally at 8, is of Y form. The secondary is wound with the coils 9 having associated therewith resistances 9, $9^a$, $9^b$, the function of which is to increase the slip and when properly designed and proportioned with respect to the rotor windings to secure maximum torque at 100 per cent slip or standstill.

One important feature of the invention is the location and arrangement of the resistances 9, $9^a$, $9^b$, which are coils or tapped parts of a coil mounted within the motor frame but nevertheless out of range of the more delicate motor parts which should be protected from heat and in a place where the heat produced in the resistances is rapidly dissipated to the outside air. Specifically the resistances are located in or adjacent to a fan or blower which ventilates the motor. This fan comprises a suitable impeller 10 in a chamber $10^a$, said impeller having a disc or wall 11 on one side and a ring or annulus 12 on the other, said disc and annulus being connected by radially extending blades 13. The impeller is mounted on the rotor shaft with the opening in annulus 12 facing the rotor and forming the fan inlet, a series of holes 14 in the casing forming the outlet. Other like holes 15 in the casing wall or end head permit free flow of air through the motor casing. The resistances before mentioned are mounted in the fan impeller in the space within the annulus 12, being shown as secured to the disc 11 by suitable straps 16.

With this arrangement the resistance in the motor circuit is carried by the rotating parts and requires no slip rings, thereby adapting the motor for convenient portable use. At the same time said resistance, while a part of the motor, is separate from its rotor windings, which therefore may be of ordinary form and not specially wound with high resistance, which subjects them to destructive heat effects except for very intermittent service. In addition the resistance is in the direct path of the ventilating air current circulated through the motor and is automatically cooled and ventilated, the heat being dissipated directly to the outside air without being carried over or around the more delicate parts. From the electrical standpoint the motor may be built with the necessary resistance to give high starting torque at low speed and is, therefore, admirably adapted for driving reamers or other similar tools where high torque at low speed is desirable.

What I claim is:

1. In combination, a casing, an operating shaft, a stator mounted in said casing, an associated wound rotor therefor connected to operate said shaft, means for causing the flow of a current of air through said casing, and resistance for said rotor separate from the rotor winding and located in said air current beyond the rotor, so that heat generated in the resistance is conducted away from the windings.

2. In combination, a hollow casing, an operating shaft, a stator within said casing, a wound rotor connected to drive said shaft, a fan for ventilating the motor casing, said fan being arranged to draw air from the windings and discharge the same through the casing, and a resistance for said wound rotor separate from the rotor winding and located in the fan chamber, whereby heat generated in the resistance is conducted away from the windings.

3. In combination, a casing, an operating shaft, a stator mounted within said casing, a wound rotor associated with said stator and connected to drive said shaft, a fan member mounted to turn with said rotor and arranged to draw air from the windings and discharge the same through the casing, and resistance for said rotor carried by said fan member and rotatable therewith.

4. An induction motor, comprising a casing, a stator mounted therein, an associated wound rotor, and resistance therefor rotatable with said rotor and located within said casing and spaced longitudinally thereof from the rotor winding.

5. An induction motor, comprising a hollow casing including a fan chamber, a stator, an associated wound rotor, a ventilating fan in said chamber longitudinally spaced from the windings, and a resistance for said rotor rotatable therewith and located in said fan chamber.

In testimony whereof I hereby affix my signature.

EDWIN L. CONNELL.